(12) United States Patent
Patronas et al.

(10) Patent No.: US 11,800,266 B2
(45) Date of Patent: Oct. 24, 2023

(54) HYBRID OPTOELECTRICAL SWITCHES

(71) Applicant: MELLANOX TECHNOLOGIES, LTD., Yokneam (IL)

(72) Inventors: Ioannis (Giannis) Patronas, Athens (GR); Paraskevas Bakopoulos, Ilion (GR); Elad Mentovich, Tel Aviv (IL); Barak Gafni, Sunnyvale, CA (US); Adam V. Richards, Bonney Lake, WA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 7 days.

(21) Appl. No.: 17/332,148

(22) Filed: May 27, 2021

(65) Prior Publication Data

US 2022/0377441 A1 Nov. 24, 2022

(30) Foreign Application Priority Data

May 19, 2021 (GR) ............................... 20210100334

(51) Int. Cl.
 *H04Q 11/00* (2006.01)
 *H04L 45/02* (2022.01)

(52) U.S. Cl.
 CPC ......... *H04Q 11/0071* (2013.01); *H04L 45/04* (2013.01); *H04Q 11/0005* (2013.01); *H04Q 2011/009* (2013.01); *H04Q 2011/0052* (2013.01); *H04Q 2213/003* (2013.01); *H04Q 2213/322* (2013.01)

(58) Field of Classification Search
 None
 See application file for complete search history.

(56) References Cited

U.S. PATENT DOCUMENTS

| | | | | |
|---|---|---|---|---|
| 4,718,063 A | * | 1/1988 | Reedy | H04J 14/08 370/534 |
| 8,270,830 B2 | * | 9/2012 | Kirkpatrick | H04Q 11/0005 398/48 |
| 8,792,787 B1 | * | 7/2014 | Zhao | H04B 10/2575 398/48 |
| 8,965,203 B1 | * | 2/2015 | Vahdat | H04J 14/0282 398/79 |
| 9,166,692 B1 | * | 10/2015 | Felderman | H04B 10/27 |
| 9,247,325 B2 | * | 1/2016 | Patel | H04J 14/0205 |
| 9,520,961 B2 | * | 12/2016 | Xia | H04Q 11/0003 |
| 9,551,838 B2 | * | 1/2017 | Jones | H04J 14/0212 |

(Continued)

OTHER PUBLICATIONS

Christodoulopulos et al: "Performance Evaluation of a Hybrid Optical/Electrical Interconnect", Opt. Commun. Netw. vol. 7, No. 3, Mar. 2015, pp. 193-204 (Year: 2015).*

(Continued)

*Primary Examiner* — Li Liu

(74) *Attorney, Agent, or Firm* — Sheridan Ross P.C.

(57) ABSTRACT

A device for a network switch comprises N input ports, and an electrical block including a plurality of electrical switches configured to route signals in an electrical domain. Each electrical switch includes M input ports, and the device further comprises an optical block coupled to the electrical block. The optical block is configured to route signals in an optical domain. A configuration of the optical block and a configuration of the electrical block are based on at least a number of the N input ports.

8 Claims, 8 Drawing Sheets

(56) References Cited

U.S. PATENT DOCUMENTS

| | | | | |
|---|---|---|---|---|
| 9,654,853 | B2* | 5/2017 | Mehrvar | H04Q 11/0066 |
| 9,742,489 | B2* | 8/2017 | Yin | H04B 10/0795 |
| 9,756,407 | B2* | 9/2017 | Kakande | H04L 49/65 |
| 9,929,933 | B1* | 3/2018 | Viljoen | H04L 45/306 |
| 9,980,021 | B2* | 5/2018 | Oltman | H04Q 11/0005 |
| 10,200,305 | B2* | 2/2019 | Frankel | H04L 49/15 |
| 10,212,496 | B2* | 2/2019 | Frankel | H04Q 11/0005 |
| 10,231,036 | B1* | 3/2019 | Ben-Itzhak | G02B 6/3546 |
| 10,231,038 | B2* | 3/2019 | Rickman | G02F 1/2257 |
| 10,306,344 | B2* | 5/2019 | Mehrvar | H04Q 11/0005 |
| 10,313,768 | B2* | 6/2019 | Yang | H04Q 11/0062 |
| 10,491,302 | B1* | 11/2019 | Morris | G06F 1/20 |
| 10,491,973 | B2* | 11/2019 | Rickman | H04Q 11/0005 |
| 10,834,484 | B2* | 11/2020 | Frankel | H04Q 11/0003 |
| 11,095,961 | B2* | 8/2021 | Liu | H04Q 11/0062 |
| 2005/0191004 | A1* | 9/2005 | Hosino | H04Q 11/0005 385/16 |
| 2009/0257751 | A1* | 10/2009 | Sadananda | H04J 14/0294 398/83 |
| 2012/0008945 | A1* | 1/2012 | Singla | H04J 14/0204 398/45 |
| 2013/0287397 | A1* | 10/2013 | Frankel | H04J 14/0213 385/16 |
| 2014/0056371 | A1* | 2/2014 | Ji | H04J 14/0298 375/260 |
| 2014/0270761 | A1* | 9/2014 | Xu | H04Q 11/0005 398/45 |
| 2014/0341568 | A1* | 11/2014 | Zhang | H04Q 11/0005 398/34 |
| 2015/0181317 | A1* | 6/2015 | Yin | H04J 14/0204 398/45 |
| 2015/0295756 | A1* | 10/2015 | Yin | H04L 49/60 370/254 |
| 2021/0044356 | A1* | 2/2021 | Aboagye | G02B 6/4256 |
| 2022/0019030 | A1* | 1/2022 | Kusayama | G02F 1/0147 |

OTHER PUBLICATIONS

"Stacked Switch vs Chassis Switch at the Core," Fiber Optic Network Products, Jun. 22, 2018, 9 pages [retrieved online from: www.fiberopticshare.com/stacked-switch-vs-chassis-switch-core.html].

"Switch System Product Brief for the CS7500 InfiniBand Switch," Mellanox Technologies, 2018, Rev. 2.1, 2 pages.

"Switch System Product Brief for the CS8500 Mellanox Quantum™ HDR Modular Switch," Mellanox Technologies, 2019, Rev. 1.5, 2 pages [retrieved online from: www.mellanox.com/files/related-docs/prod_ib_switch_systems/PB_CS8500.pdf].

"Switch System Product Brief for the QM8790 Mellanox Quantum™ HDR Edge Switch," Mellanox Technologies, 2020, Rev. 2.1, 2 pages [retrieved online from: www.mellanox.com/sites/default/files/doc-2020/pb-qm8790.pdf].

Michelogiannakis et al. "Bandwidth Steering in HPC Using Silicon Nanophotonics," SC '19: Proceedings of the International Conference for High Performance Computing, Networking, Storage and Analysis, Nov. 2019, Article 41, 25 pages.

U.S. Appl. No. 17/870,968, filed Jul. 22, 2022, Patronas et al.

* cited by examiner

HYBRID OPTOELECTRICAL SWITCHES

CROSS REFERENCE TO RELATED APPLICATIONS

This application claims the benefit of Greek Patent Application No. 20210100334 filed May 19, 2021, the disclosure of which is incorporated herein by reference in its entirety.

FIELD OF THE DISCLOSURE

The present disclosure is generally directed to hybrid optoelectrical switches, and more particularly, to hybrid optoelectrical switches for networking systems.

BACKGROUND

Datacenters may include multiple network switches in a particular topology, such as a fat tree topology, a slim fly topology, a dragonfly topology, and/or the like. The specifications and makeup of the network switches in the topology affects the overall network performance (e.g., bandwidth capability) of the datacenter.

BRIEF SUMMARY

In an illustrative embodiment, a device for a network switch comprises N input ports, an electrical block including a plurality of electrical switches configured to route signals in an electrical domain. Each electrical switch includes M input ports, and the device further comprises an optical block coupled to the electrical block and configured to route signals in an optical domain. A configuration of the optical block and a configuration of the electrical block are based on at least a number of the N input ports.

In another illustrative embodiment, a semiconductor package comprises a substrate, N input ports, an electrical block on the substrate and configured to route signals in an electrical domain. The electrical block includes a plurality of electrical switches and each electrical switch includes M input ports. The semiconductor package further comprises an optical block on the substrate and communicatively coupled to the electrical block, the optical block being configured to route signals in an optical domain. A configuration of the optical block and a configuration of the electrical block are based on at least a number of the N input ports.

In another illustrative embodiment, a system comprises a plurality of network devices configured in a hierarchical network topology. At least one of the network devices includes N input ports, and an electrical block coupled to the N input ports and including a plurality of switches configured to route signals in an electrical domain, where each switch includes M input ports. The at least one of the network devices further comprises an optical block coupled to the electrical block and configured to route signals in an optical domain. A configuration of the optical block and a configuration of the electrical block are based on a number of the N input ports and a number of the M input ports.

Additional features and advantages are described herein and will be apparent from the following description and the figures.

BRIEF DESCRIPTION OF THE DRAWINGS

The present disclosure is described in conjunction with the appended figures, which are not necessarily drawn to scale.

DETAILED DESCRIPTION

Figure 1:
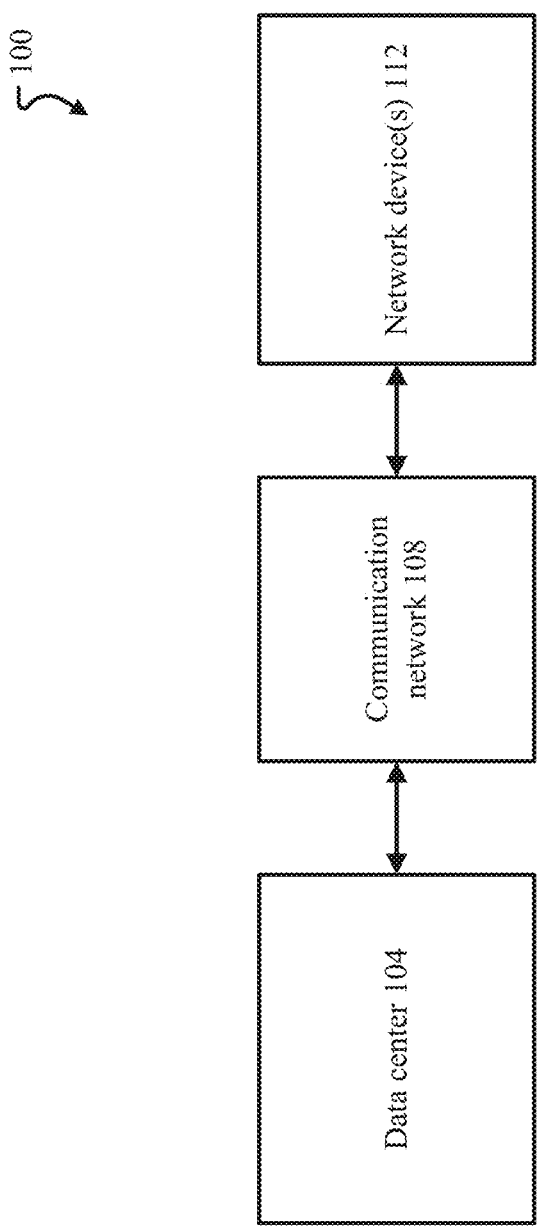
FIG. 1 illustrates a block diagram of a networking system according to at least one example embodiment.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Datacenters are the storage and data processing hubs of the internet. The massive deployment of cloud applications is causing datacenters to expand exponentially in size, stimulating the development of faster switches than can cope with the increasing data traffic inside the datacenter. Current state-of-the-art switches are capable of handling 12.8 Tb/s of traffic by employing electrical switches in the form of application specific integrated circuits (ASICs) equipped with 256 data lanes, each operating at 50 Gb/s. Such switching ASICs typically consume as much as 400 W, and the power consumption of the optical transceiver interfaces attached to each ASIC is comparable. To keep pace with traffic demand, switch capacity doubles approximately every two years. To date, this rapid scaling has been made possible by exploiting advances in manufacturing (e.g., CMOS techniques), collectively described by Moore's law (i.e., the observation that the number of transistors in a dense integrated circuit doubles about every two years). However, in recent years there are strong indications of Moore's law slowing down, which raises concerns about the capability to sustain the target scaling rate of switch capacity. As a result, alternative technologies are being investigated.

Optical switches are one solution for enabling advances in networking due to the technology's potential for very high data capacity and low power consumption. Optical switches feature optical input and output ports and are capable of routing light that is coupled to the input ports to the intended output ports on demand, according to one or more control signals (electrical or optical control signals). Routing of the signals is performed in the optical domain, i.e. without the need for optical-electrical and electrical-optical conversion, thus bypassing the need for power-consuming transceivers. Header processing and buffering of the data is not possible in the optical domain and thus, packet switching (as it is realized in electrical switches) cannot be employed. Instead, the circuit switching paradigm is used: an end-to-end circuit is created for the communication between two endpoints connected on the input and the output of the optical switch.

Inventive concepts propose a hybrid optical/electrical (or optoelectrical) switching system, which may take the form of an integrated box or package having electrical and optical switches. Example embodiments may employ the hybrid switch for chassis switching systems (e.g., director switches) where switching ASICs are inserted as blades/line cards. Director switches may be used in the most common datacenter interconnection topologies, e.g., fat trees, Slim Fly, and Dragonfly+). In addition, inventive concepts propose to place such hybrid switching systems "in the middle" of the network (e.g., replacing the edge/top of rack (TOR) layer and aggregation layer).

Inventive concepts encompass at least the following features: providing a "hybrid switch in a box;" facilitating the scalability of director switches and of datacenter networks; reducing power consumption of director switches/switching systems; providing a direct application for bandwidth steering concepts; providing more convenient and efficient control of the optical switches; allowing scaling of top of rack (ToR) switch port count; futureproofing by providing bandwidth and higher rates on the backplane and by reducing optical/electrical/optical conversions; and reducing cabling.

FIG. 1 illustrates a system 100 according to at least one example embodiment. The system 100 includes a datacenter 104, a communication network 108, and one or more network devices 112. In at least one example embodiment, the datacenter 104 corresponds to a collection of network devices, such as network switches (e.g., Ethernet switches) connected with a collection of servers or compute nodes. The datacenter 104 may adhere to a networking topology (e.g., a hierarchal networking topology), such as a fat tree topology, a Slim Fly topology, a Dragonfly topology, and/or the like. The datacenter 104 routes traffic amongst the network switches and servers therein, and at least one layer of the topology in the datacenter 104 is coupled to the communication network 108 to allow networking traffic to flow between the datacenter 104 and the network device(s) 112. As described in more detail below, one or more layers of the topology may comprise one or more hybrid optoelectrical switches according to inventive concepts.

Examples of the communication network 108 that may be used to connect the datacenter 104 and the network device(s) 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like.

The one or more network devices 112 may include one or more of Personal Computer (PC), a laptop, a tablet, a smartphone, a server, a collection of servers, and/or any suitable computing device for sending and receiving signals over the communication network 108. In at least one example embodiment, the one or more network devices 112 correspond to another datacenter, similar to or the same as datacenter 104.

As noted above, the datacenter 104 and/or the network device(s) 112 may include storage devices and/or processing circuitry for carrying out computing tasks, for example, tasks associated with controlling the flow of data internally and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a Graphics Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry.

In addition, although not explicitly shown, it should be appreciated that the datacenter 104 and network device(s) 112 may include one or more communication interfaces for facilitating wired and/or wireless communication between one another and other unillustrated elements of the system 100.

Figure 2:
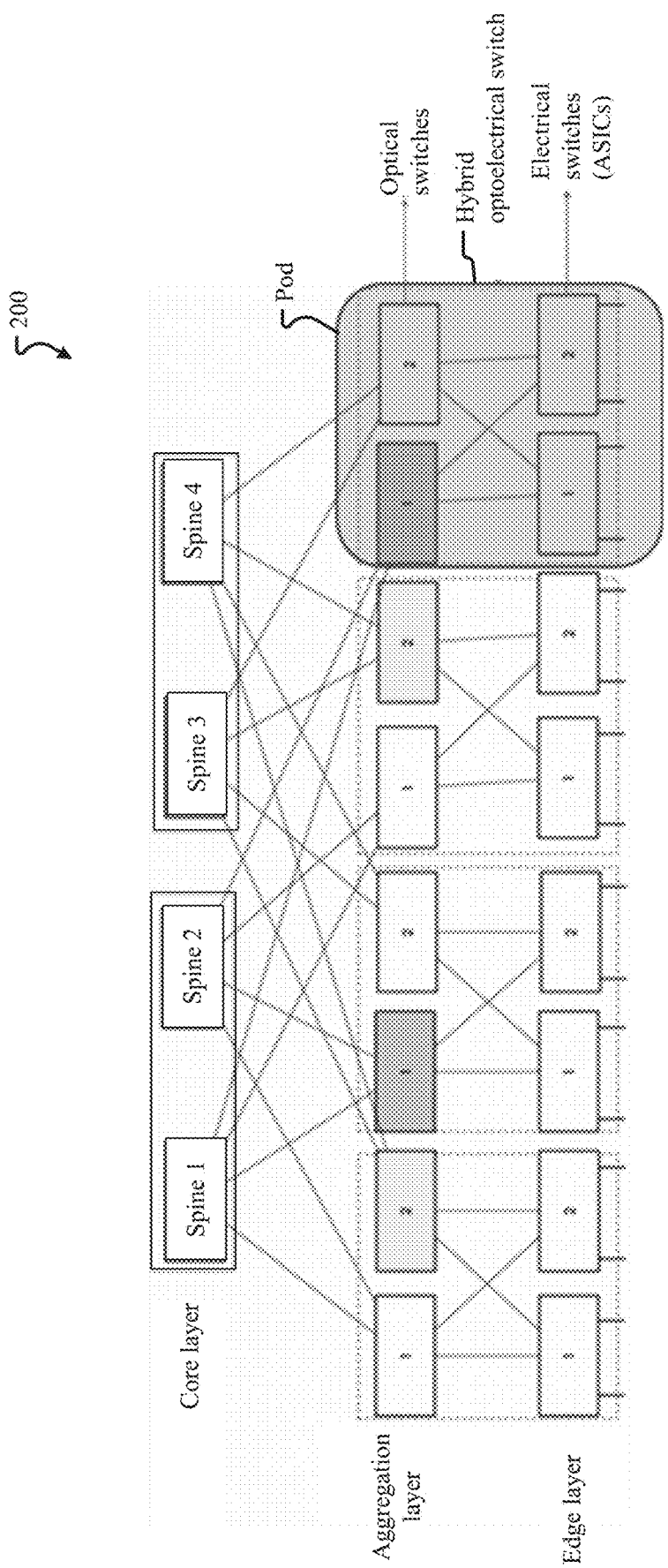
FIG. 2 illustrates a network topology that may employ hybrid optoelectrical switches according to at least one example embodiment.
Figure 3:
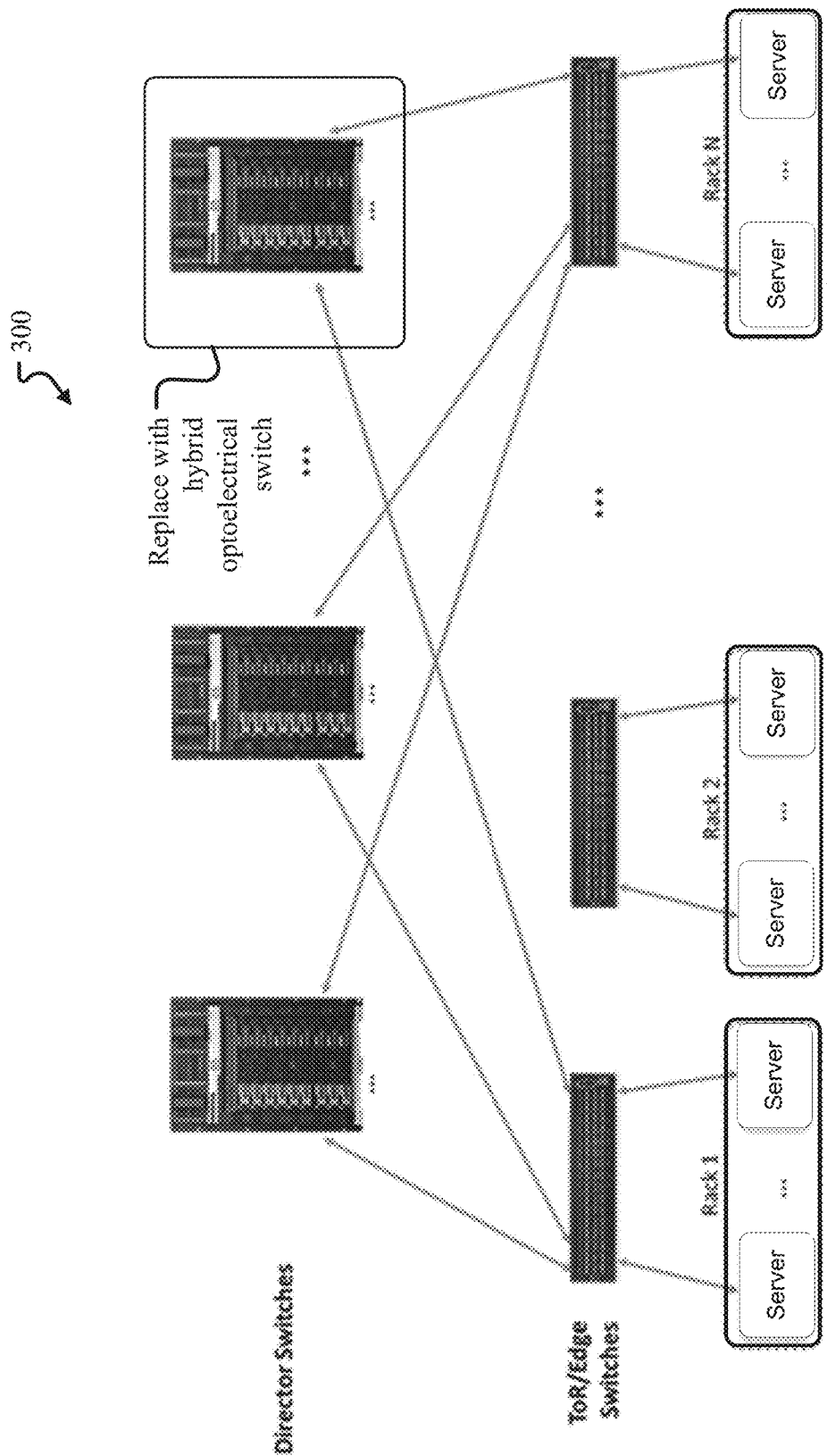
FIG. 3 illustrates another network topology that may employ hybrid optoelectrical switches according to at least one example embodiment.
Figure 4:
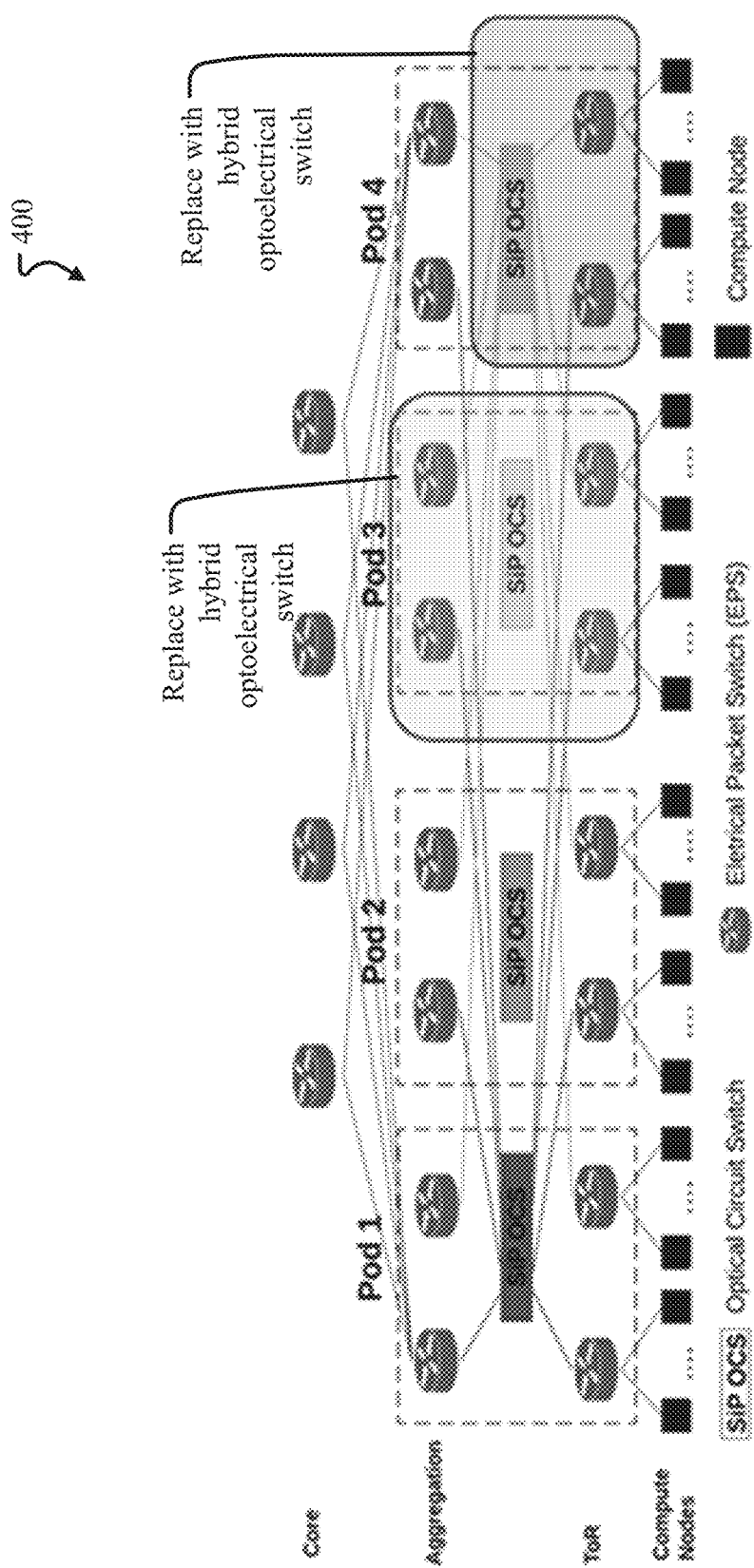
FIG. 4 illustrates another network topology that may employ hybrid optoelectrical switches according to at least one example embodiment.

FIGS. 2-4 illustrate various examples of topologies for a datacenter according to example embodiments. As discussed in more detail below, hybrid optoelectrical switches according to example embodiments may be used to replace electrical switches in various layers within the illustrated topologies.

FIG. 2 illustrates a topology 200 that may employ hybrid optoelectrical switches. The topology 200 corresponds to a fat tree topology having multiple layers of switching to support high numbers of servers. In FIG. 2, the fat tree topology 200 comprises three layers: the edge layer (which includes ToR switches), the aggregation layer, and the core layer. Traffic from the servers is aggregated at the edge layer (servers and server racks not shown but generally connected to the edge layer at the bottom of the illustrated edge layer). In FIG. 2, the aggregation and core layers provide the capability for communication among different racks.

In FIG. 2, each illustrated box (e.g., spine 1, spine 2, aggregation 1, aggregation 2, etc.) may correspond to a device that contains one electrical switching device (e.g., an electrical switching ASIC). In related art systems, a fat tree topology may use the same electrical switching devices on all layers (edge, aggregation, core). For example, each switching device may be 1U switch, where 1U refers to the industry standard size for rack-mounted switch and/or server. The interconnection between switches of different layers may be accomplished with optical links using active optical cables and optical transceivers implemented in a pluggable form factor (also referred to as "pluggables").

At least one example embodiment proposes to modify the fat tree topology 200 by replacing the edge layer switches and aggregation layer switches with hybrid optoelectrical switches while the core layer switches (spine 1 to 4) remain electrical. That is, as shown on the right-side of the figure, a hybrid optoelectrical switch according to inventive concepts may replace a whole pod of electrical switches. In general, a pod, also referred to as point of delivery, should be generally understood as a collection of network elements (e.g., switches and/or servers) that is repeatable for the topology at issue. Still with reference to the far right-side of FIG. 2, the hybrid optoelectrical switch may include the same number of electrical switches at the edge layer as in a scenario that does not employ a hybrid optoelectrical switch, but the electrical switches are integrated with optical switches in the hybrid optoelectrical switch. As shown for the hybrid optoelectrical switch, the aggregation layer electrical switches may be replaced by optical switches, which are integrated with the electrical switches at the edge layer in a hybrid optoelectrical switch. Although the edge layer maintains electrical switching ASICs, these electrical switches are co-packaged with the optical switches in a single "box," which enables reduced power consumption, high speeds, efficiency, and/or signal quality.

FIG. 3 illustrates a topology 300 that may employ hybrid optoelectrical switches. For example, in at least one example embodiment, the illustrated director switches are replaced with hybrid optoelectrical switches (see far right-side of the figure). Without the hybrid optoelectrical switch modification, it should be appreciated that FIG. 3 shows an alternative approach for the core and aggregation layers in FIG. 2 by employing a modular chassis or a modular switching system. That is, the topology shown in FIG. 3 is still a fat tree topology like FIG. 2, but the core and aggregation layers are integrated into a single device (the director switch) that provides a backplane for layer connections. A modular chassis switching system may avoid some of the disadvantages associated with power consuming pluggables and the optical to electrical to optical (O/E/O) conversions associated therewith. In addition, a modular chassis system may better distribute overheads. Without the hybrid optoelectrical switch modification, the director switches may include the same number of electrical switching ASICs as the aggregation and core layers of non-modified topology in FIG. 2. In addition, the director switches also provide the same or similar connectivity within the aggregation and core layers as in FIG. 2, but instead of using pluggables and fibers to connect the aggregation and core layers, the director switches use an electrical backplane. The number of ports for a modular chassis system in topology 300 may range from 800-1600 and an example form factor for the topology 300 is 29U.

As noted above, inventive concepts propose to replace the director switches in topology 300 with hybrid optoelectrical switches, which results in certain advantages over the same topology that only uses director switches. For example, as the bandwidth of servers increases, so should the bandwidth of the electrical switches. For director switches, this means that more electrical switching ASICs should be used and that each ASIC should support higher bandwidth, both of which correspond to increased cost and increased power consumption. In addition, it is possible that the electrical backplane of a director switch may not be able to support higher data rates due to signal degradation effects. Replacing the director switches in FIG. 3 with hybrid optoelectrical switches in topology 300 may avoid the additional O/E/O that occurs if the backplane becomes optical while still providing sufficient bandwidth.

FIG. 4 illustrates another topology 400 that may employ hybrid optoelectrical switches according to example embodiments.

FIG. 4 illustrates a topology 400 that enables a bandwidth steering scheme, where silicon photonics optical circuit switches (SiP OCSs) may be used to steer the bandwidth among the appropriate ToR switches for relatively long time periods by reconfiguring in a slow manner. This way, the bandwidth that reaches the higher layers of the network is tapered compared to lower layers of the network. The electrical packet switches illustrated in FIG. 4 may correspond to electrical switching ASICs. As shown in FIG. 4, the topology 400 may be modified by replacing the ToR and SiP OCS switches with a hybrid optical electrical switch while still enabling bandwidth steering ability (see far right of the figure). In another example, the hybrid optoelectrical switch may replace each pod to offer a one device solution for the ToR and aggregation layers. This is illustrated in FIG. 4 with Pod 3 which includes the ToR switches, optical SiP OCS switches, and aggregation layer switches.

The hybrid optoelectrical switch in FIGS. 5-8 may be implemented with silicon photonics. That is, the electrical switches and/or the optical switches depicted in FIGS. 5-8 may be formed in and/or on a silicon wafer in accordance with suitable silicon photonics techniques. However, example embodiments are not limited to implementing a hybrid optoelectrical switch with silicon photonics technology, and the hybrid optoelectrical switches described herein may be implemented with any suitable technology.

Although FIGS. 2-4 illustrate specific examples of where hybrid optoelectrical switches (hybrid optoelectrical switches according to FIGS. 5-8, for example) may be placed within a particular topology, it should be appreciated that example embodiments are not limited thereto and that a hybrid optoelectrical switch may be employed at any suitable layer of any suitable datacenter topology. In addition, it should be appreciated that although FIGS. 2-4 illustrate substitution of a hybrid optoelectrical switch for a particular pod or particular switches, the substitution may be carried out across the entire topology. For example, the topology 200 is modified so that hybrid optoelectrical switches are used for every pod in the topology and not just the far-right pod as shown. The same concept is true for topologies 300 and 400 in FIGS. 3 and 4 where hybrid optical switches take the place of one or more layers of a topology across the entire topology.

FIGS. 5-8 illustrate various examples of hybrid optoelectrical switches according to example embodiments. Throughout the instant description, the terms "electrical switch," "electrical switching ASIC," "ASIC," and variants thereof are used interchangeably. Although FIGS. 5-8 illustrate the electrical switches in the electrical blocks as being embodied by ASICs, example embodiments are not limited thereto, and the electrical switches may be implemented with any suitable hardware and/or software that enables routing of signals in the electrical domain. In addition, a set of optical switches at one or more levels of a hybrid optoelectrical switch may be referred to herein as an optical block while a set of electrical switches at one or more levels of a hybrid optoelectrical switch may be referred to as an electrical block.

Each illustrated hybrid optoelectrical switch in FIGS. 5-8 substitutes at least some of the electrical switching ASICs of a typical network switch topology for optical switches. Here, it should be appreciated that the hybrid optoelectrical switches in FIGS. 5-8 may each correspond to a network unit in the datacenter 104, which may include a rack mounted enclosure containing a printed circuit board (PCB) with discrete electronic and photonic components or co-packaged electronic and photonic components using known packaging concepts (e.g., onboard optics, MCM (multi-chip modules), and/or the like). In at least one example embodiment, a hybrid optoelectrical switch includes the electrical switches (ASICs) and the optical switches co-packaged together. That is, the illustrated ASICs and optical switches may be mounted on the same PCB (or on the same silicon wafer) and coupled to one another with suitable devices for optical and/or electrical communication (e.g., waveguides (e.g., silicon waveguides) for optical communication and copper traces for electrical communication). The proposed designs in FIGS. 5-8 may be employed in one or more of the topologies depicted in FIGS. 2-4 and may offer a wide range of different capabilities and functionalities depending on the requirements of the overall system.

In general, the ASICs illustrated in FIGS. 5-8 correspond to electrical switches that route signals in an electrical domain while the optical switches (sometimes abbreviated as "Opt. Sw.") illustrated in FIGS. 5-8 route signals in an optical domain. That is, the ASICs correspond to electrical switches that operate in the electrical domain by routing electrical signals while the optical switches operate in the optical domain by routing optical signals.

Although not explicitly shown, an electrical switch and/or an optical switch may include suitable hardware and/or software that enable routing of signals in a respective domain.

For example, an electrical switch may include receivers that receive and convert optical signals into electrical signals for routing within the electrical switch. For example, a receiver of an electrical switch may include a transimpedance amplifier (TIA), a photodetector, and a controller which all serve to convert the optical signals into electrical signals. Each electrical switch may further include transmitters that convert electrical signals routed within the electrical switch into optical signals for output to another switch (optical or electrical) within the system. For example, a transmitter of an electrical switch may include a light source, a modulator, and a controller that controls the modulator and light source. In at least one example embodiment, receiver/transmitter pairs are integrated into a single transceiver. Each electrical switch may further include internal switching circuitry for routing electrical signals within the electrical switch.

An optical switch may include hardware and/or software for routing signals in the optical domain. Thus, in one embodiment, an optical switch may include input optical fibers and output optical fibers that carry optical signals as well as one or more devices suited for routing optical signals within the optical switch. For example, the one or more devices for routing optical signals may include one or more movable mirrors (e.g., MEMS mirrors) that are controlled to move in a manner that directs light from an input fiber to a desired output fiber or to move in a manner that forces or guides light from one waveguide into another waveguide. An optical switch may include one or more devices for amplifying light in order to compensate for propagation and scattering losses introduced by the optical switch. In at least one example embodiment, signals input and output to an ASIC are optical, meaning that each optical switch connected to an electrical switch routes optical signals received from the electrical switch without using hardware and/or software that converts an electrical signal into an optical signal for routing within the optical switch. However, example embodiments are not limited thereto, and an optical switch may include electrical to optical to electrical conversion hardware and/or software if desired (e.g., if the input signal and/or output signal is an electrical signal).

In FIGS. 5-8, an M port ASIC should be understood as an electrical switch (ASIC) having M number of input ports. The M number of input ports in FIG. 5 may comprise M/2 input ports at a bottom side of an ASIC that interface with the external world or another layer of the datacenter topology and M/2 input ports at a top side of the ASIC that couple to the optical switches. An M port ASIC in FIGS. 6-8 may comprise M number of input ports at a bottom side of an ASIC, where these M input ports interface with the external world or another layer of a datacenter topology. In FIGS. 5-8, N may refer to the total number of input ports (or the total number of output ports) for each illustrated hybrid optoelectrical switch. As may be appreciated, M is generally less than N because there are usually multiple ASICs that makeup the input ports of a hybrid optoelectrical switch.

In addition, a number of input ports at one side of an electrical switch may be equal to a number of output ports at the same side of the electrical switch or at the opposite side of the switch, depending on the particular design.

Figure 5:
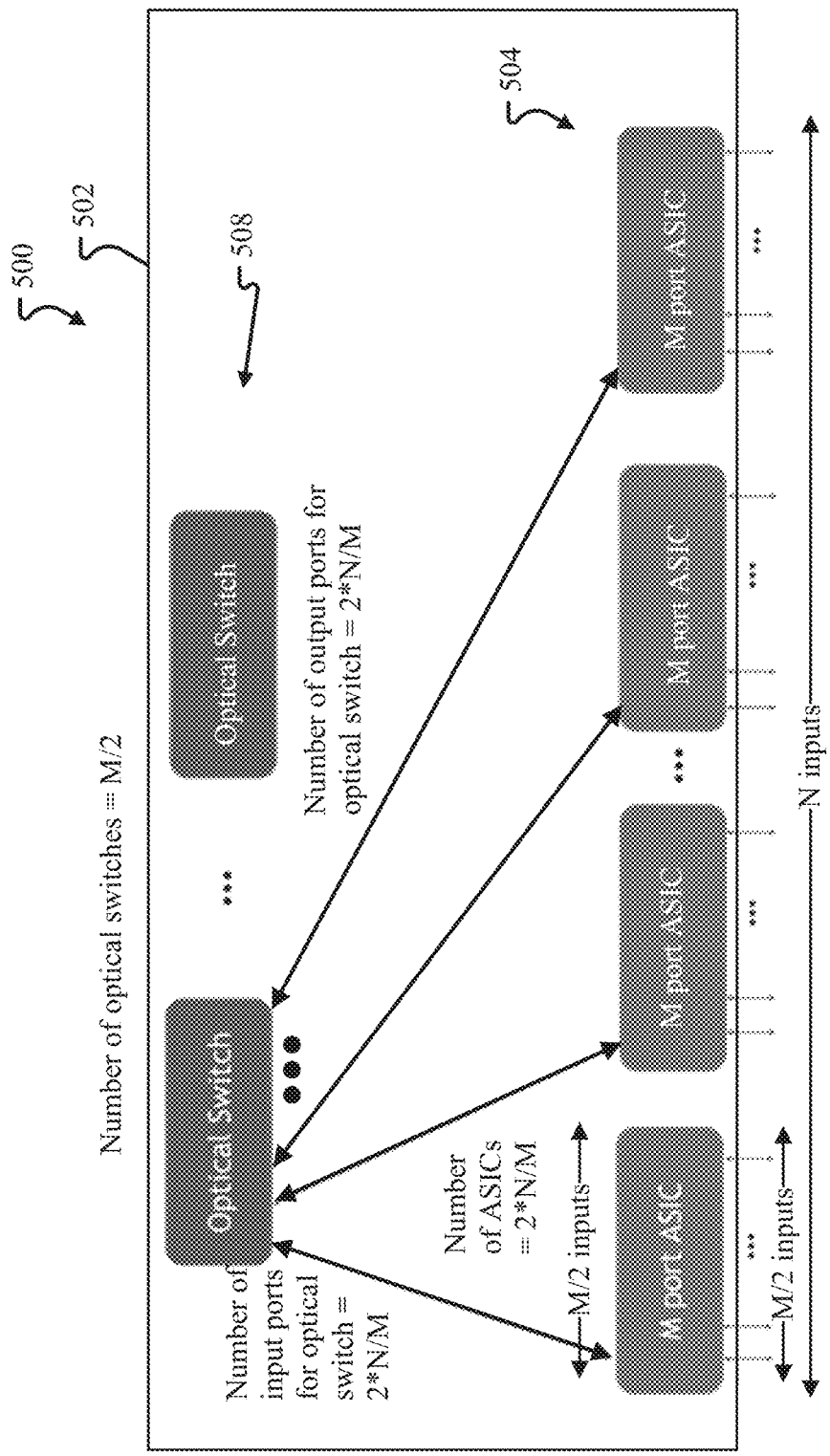
FIG. 5 illustrates a hybrid optoelectrical switch according to at least one example embodiment.

FIG. 5 illustrates a hybrid optoelectrical switch 500 according to at least one example embodiment. The following related-art example is provided in order to provide a better understanding of the advantages of the hybrid optoelectrical switch 500. In a typical director switch, the bottom set of ASICs shown in FIG. 5 is connected to a top set of ASICs by an electrical backplane (top set of ASICs and electrical backplane not shown in FIG. 5). For example, the bottom ports of the ASICs in FIG. 5 are optical ports while the top ports of the ASICs are electrical ports connected to one side of the electrical backplane. The electrical backplane is further connected to more electrical switching ASICs on the other side of the backplane. For the sake of this example, assume each ASIC has 64 ports@ 200 Gbps (i.e., M=64). In order to construct a non-blocking director switch with 640 input ports and 640 output ports @200 Gbps each (i.e., 'N'=640), 30 total ASICs are needed. 20 ASICs are placed in the bottom level in FIG. 5 with half of the ports facing the external world and the other half of the ports facing the electrical backplane. The remaining 10 ASICs are placed on the top level in FIG. 5 with all the ports facing the backplane (again, top level ASICs and backplane not shown). As may be appreciated, the total number of ASICs needed for this related-art example is 3*N/M, where M is the number of input ports per ASIC and N is the total number of input ports that connect to the external world (e.g., to compute nodes). In this case, N/M number of ASICs are on the top level and 2*N/M number of ASICs are on the bottom level. In general, the terms "top" and "bottom" are used for convenience of explanation when referring to the figures and these terms are not intended to limit the location of inputs and/or outputs of an electrical and/or optical switch and/or limit the topology of the hybrid optoelectrical switches in FIGS. 5-8.

Turning to the hybrid optoelectrical switch 500 in FIG. 5, it should be appreciated that the ASICs at the top level mentioned in the related-art example are replaced with an optical block having the same number of input ports and output ports as the related-art top level ASICs. In other words, FIG. 5 illustrates an electrical block 504 having N input ports for the hybrid optoelectrical switch 500. The electrical block 504 includes a plurality of electrical switches (e.g., ASICs) configured to route signals in an electrical domain, where each electrical switch (each ASIC) includes M input ports. As noted above M/2 input ports may interface with the external world or another layer of the datacenter topology while M/2 input ports interface with the optical switches. FIG. 5 further illustrates an optical block 508 coupled to the electrical block 504 and configured to route signals in an optical domain. The electrical block 504 and the optical block 508 may be mounted on a same PCB 502 or other support substrate (e.g., a silicon wafer) in order to have the electrical block 504 and the optical block 508 be co-packaged together. As noted above, the electrical block 504 and the optical block 508 may be coupled to one another with a suitable number of waveguides that carry signals between the ASICs and the optical switches.

As described in more detail below, a configuration of an optical block in FIGS. 5-8 and/or a configuration of the electrical block in FIGS. 5-8 are based on at least a number of the N input ports. In general, the configuration of an optical block may relate to a number of input ports of an optical switch in the optical block and a number of output ports of the optical switch in the optical block. The configuration of an optical block may further relate to a number of optical switches in the optical block. Meanwhile, the configuration of an electrical block may relate to a number of the plurality of electrical switches (e.g., a number of ASICs) and/or a number of input ports for each electrical switch.

In FIG. 5, for example, the number of optical switches is M/2 in the hybrid optoelectrical switch 500, where each optical switch includes at least one connection to every bottom level ASIC as illustrated with two-way arrows. Here, it should be appreciated that each end of the two-way arrow in FIG. 5 may represent a single port at the ASIC or the optical switch that is capable of handling incoming and outgoing traffic. Alternatively, each end of the two-way arrow represents an input port/output port pair at the ASIC or the optical switch. For example, an output port in an input/output port pair of the ASIC may be connected to an input port of an input/output port pair of the optical switch while an input port in the input/output port pair of the ASIC may be connected to an output port of the input/output port pair of the optical switch.

Still with reference to FIG. 5, each optical switch may include 2*N/M input ports and 2*N/M output ports. Compared to the related-art example discussed above that employs only electrical switching ASICs, the configuration in FIG. 5 reduces the number of electrical switching ASICs by 33% and is still non-blocking, thereby reducing power consumption and improving bandwidth capability since the optical switches do not perform O/E/O conversion. The optical switches may allocate a variable number of paths (variable aggregate bandwidth) among the "ASIC couples" either on demand or in a round robin fashion.

In FIG. 5, the optical switches in the optical block 508 may have input ports and output ports at bottom sides of the optical switches that face the input ports and output ports at the top sides of the ASICs. Thus, it may be said that the optical block 508 is configured to route signals in the optical domain between the ASICs.

Here, it should be appreciated that the hybrid optoelectrical switch 500 is not limited to the design in FIG. 5. For example, if each optical switch in FIG. 5 has N/M input ports (and N/M output ports), then the hybrid optoelectrical switch 500 may employ M number of optical switches.

A scheduling and routing scheme will now be described with reference to FIG. 5, where packets are received by the bottom side input ports of the bottom level ASICs (assume the ASICs are numbered from left to right as ASIC_1, . . . ASIC_2*N/M). The packets are routed to top side input ports of another bottom level ASIC through an optical switch. Assume the ASICs are connected to the optical block 508 and configured for slotted operation with, for example, each slot's duration being longer than the duration that an Ethernet packet requires for transmission. Since the hybrid optoelectrical switch 500 is in "a box," it is possible to have communication from the ASICs to a central point of coordination (e.g., a scheduler) that is implemented with suitable processing hardware and/or software. This communication may be achieved through electrical traces and/or waveguides on the PCB 502. In operation, the ASICs report their buffer statuses to the scheduler where the buffer statuses correspond to communication requests.

The scheduler receives the communication requests from the ASICs and calculates the I/O matchings that should be implemented by the optical switches during a next timeslot. The scheduler may solve a bipartite graph matching problem and calculate a maximal matching using an iterative algorithm such as Islip, ILQF, and/or the like. An algorithm for maximum matching, such as Hoperoft-Karp may also be used. The scheduler may operate independently for each optical switch or for all optical switches.

Example embodiments further propose a queueing policy that is useful for when the packets are queued on the ports of the ASICs before the scheduling takes place and when schedulers run independently for each optical switch. To assist the bipartite schedulers in finding matchings, example embodiments propose a priority-based queueing scheme for load balancing. In FIG. 5, the first (leftmost) port of each ASIC is connected to the first (leftmost) optical switch, the second port (second leftmost port) of each ASIC is connected to the second optical switch (second leftmost optical switch), and so on. Thus, in FIG. 5, it is possible to reach a destination ASIC from a source ASIC through any of the optical switches. For the sake of explanation, consider the scheduler of the first optical switch (leftmost optical switch) in FIG. 5. This scheduler receives traffic requests (e.g., the destinations of the packets) from the first (leftmost) port of each ASIC. The scheduler should match the inputs of the optical switch to the outputs of the optical switch based on these traffic requests. The scheduler may prioritize the queueing of different destinations on the first port of each ASIC.

For example, the following parsing rule for prioritizing buffering of the packets (or choosing the path they will follow) is based on the destination ASIC and the source ASIC: Uplink_port=(ASIC_dest+ASIC_source) modulo K (1), where the uplink port corresponds to a port of a particular optical switch, ASIC source is the ASIC that is the source of the packets being sent, and ASIC_dest is the ASIC that is the destination to which the packets are sent.

This rule prioritizes different uplink ports (i.e., optical switches) for the same destination ASIC depending on the source ASIC. For example, if ASIC_1 and ASIC_2 want to send packets to ASIC 3, this may be accomplished through Optical Switch_4 and Optical Switch 5, respectively (recall that the ASICs and optical switches are number ordered from left to right). This approach avoids allocating the same output port of an optical switch to traffic from two different ASICs. Here, it should be appreciated that the same or similar scheduling scheme may be applied to the hybrid optoelectrical switches in FIGS. 6-8.

Figure 6:
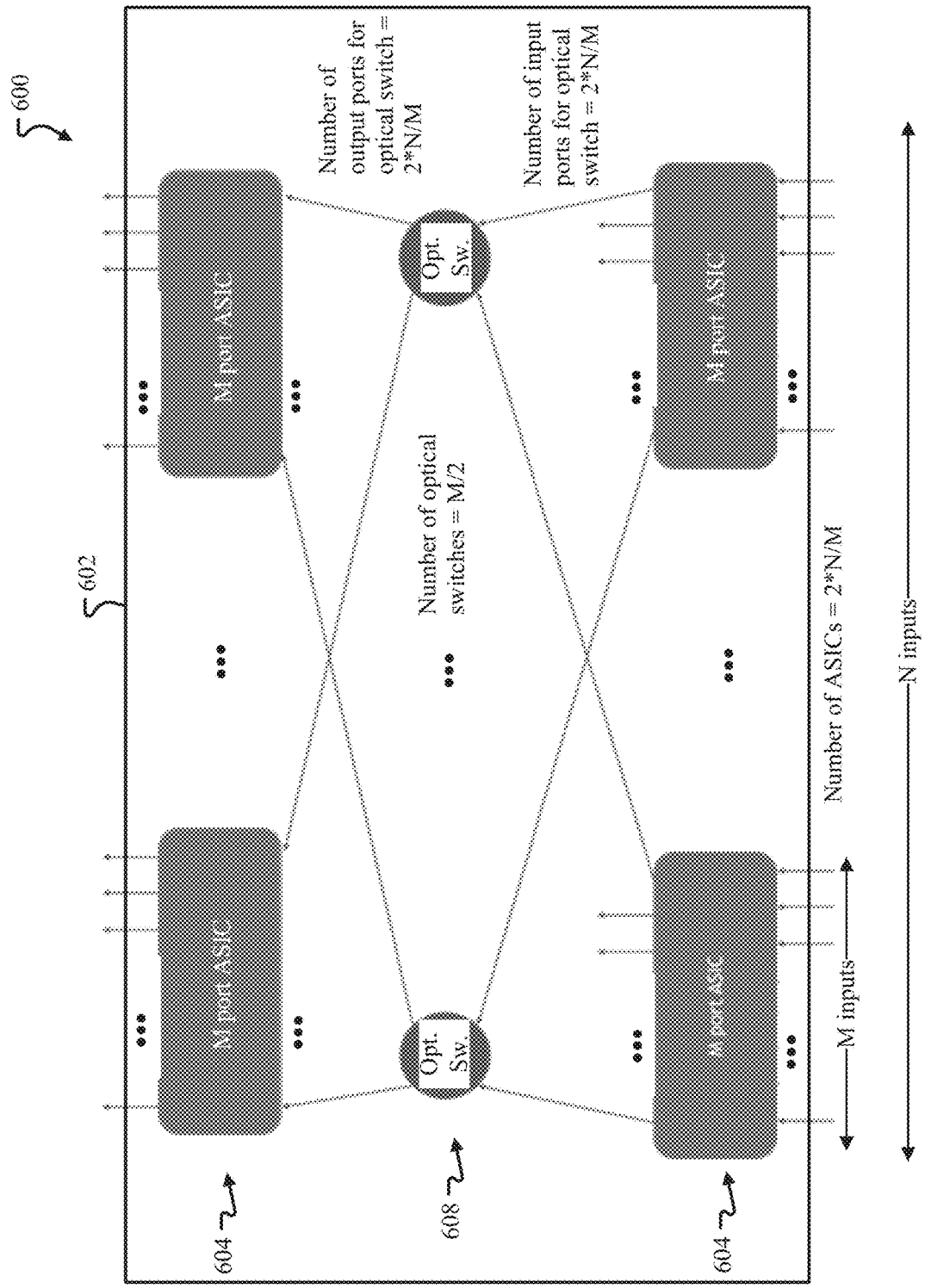
FIG. 6 illustrates another hybrid optoelectrical switch according to at least one example embodiment.

FIG. 6 illustrates another example of a hybrid optoelectrical switch 600 including an electrical block 604 (bottom and top levels of ASICs) and an optical block 608 (middle level of optical switches) co-packaged together on a PCB 602 or other support substrate (e.g., on a silicon wafer) in the same or similar manner as that described above with reference to FIG. 5. In this case, the N input ports of the hybrid optoelectrical switch 600 are depicted with arrows at the bottom of FIG. 6 while N output ports of the hybrid optoelectrical switch 600 are depicted with arrows at the top of the figure. To construct an N×N hybrid optoelectrical switch 600 (i.e., a hybrid optoelectrical switch with N input ports and N output ports), the hybrid optoelectrical switch 600 may employ a total of 2*N/M ASICs, with half of the ASICs on the top level and the other half of the ASICs on the bottom level. The number of optical switches in FIG. 6 is M/2, and the number of output ports and the number of input ports for each optical switch are both equal to 2*N/M. However, example embodiments are not limited thereto, and the number of optical switches in FIG. 6 may be equal to M, for example, when a number of input ports and a number of output ports of each optical switch are both equal to N/M.

Within the hybrid optoelectrical switch 600 and because the electrical block 604 and the optical block 608 are co-packaged on the same PCB 602, the output ports of the bottom level ASICs in FIG. 6 face the input ports of the optical switches while the output ports of the optical switches face the input ports of the top level of ASICs. Any output ports of the bottom level of ASICs that are not coupled to an optical switch in the optical block 608 may instead be connected to an input port of an ASIC in the top level of ASICs.

FIG. 6 further illustrates example connections between ports of the electric block 604 and ports of the optical block 608. In general, each optical switch may have at least one connection to every bottom level ASIC in order to enable routing of signals from a suitable bottom level ASIC to a suitable top level ASIC. The connections between ports are illustrated with one-way arrows, and the same or similar connection pattern may be extended to other ASICs and optical switches depending on the configuration of the hybrid optoelectrical switch 600. However, example embodiments are not limited thereto, and the connections between electrical switches in the electrical block 604 and optical switches in the optical block 608 may be a design parameter based on empirical evidence and/or preference. In general, for FIGS. 6-8, a one-way arrow exiting or entering an electrical or optical switch represents a port for one-way communication (i.e., an arrow into an element is a dedicated input port and an arrow out of an element is a dedicated output port). As described with reference to FIG. 5, scheduling for the optical switches in FIG. 6 may depend upon the traffic requests from the ASICs or follow a round robin schedule.

Although not explicitly illustrated, it should be appreciated that the output ports of the top level of ASICs may be connected to or connectable to another layer of electrical switches and/or optical switches within a datacenter topology.

Figure 7:
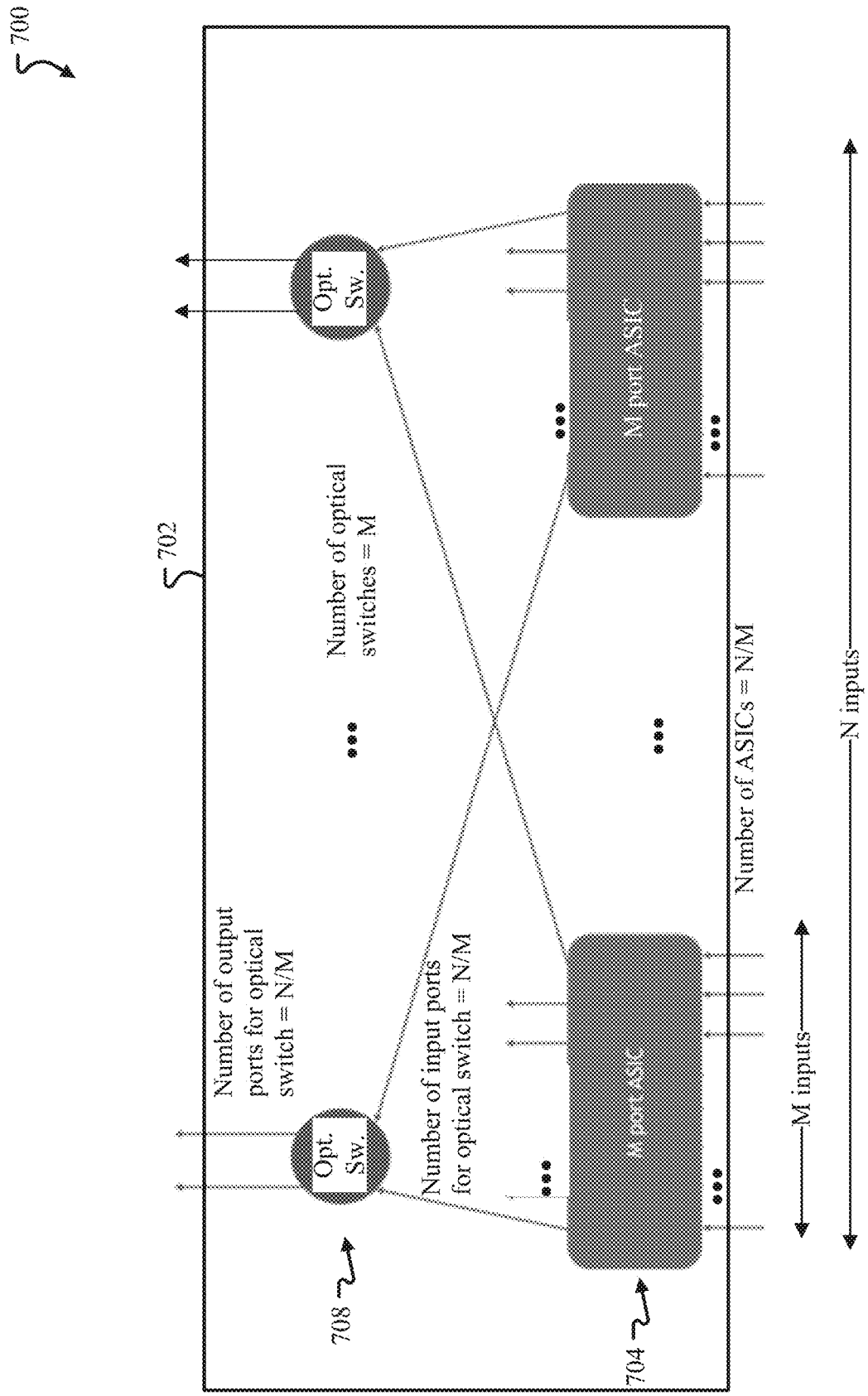
FIG. 7 illustrates another hybrid optoelectrical switch according to at least one example embodiment.

FIG. 7 illustrates a hybrid optoelectrical switch 700 including an electrical block 704 (or bottom level of ASICs) and an optical block 708 co-packaged on the same PCB 702 or other support substrate (e.g., a silicon wafer). Compared to the hybrid optoelectrical switch 600 in FIG. 6, the hybrid optoelectrical switch 700 in FIG. 7 eliminates the top layer of ASICs. The hybrid optoelectrical switch 700 may still be non-blocking with the output ports operating in circuit switched mode, and the switch 700 includes half the number of ASICs as in FIG. 6. In other words, the switch 700 uses N/M number of ASICs with each ASIC having M input ports and M output ports. In addition, the number of optical switches in switch 700 may be M and the number of input ports and the number of output ports for each optical switch are both N/M. However, example embodiments are not limited thereto, and the number of optical switches may be equal to M/2, for example, when each optical switch includes 2*N/M input ports and 2*N/M output ports.

As shown in FIG. 7, output ports of the ASICs face input ports of the optical switches on the PCB 702. FIG. 7 further illustrates example connections between ports of the electrical block 704 and ports of the optical block 708. In general, each optical switch may have at least one connection to every bottom level ASIC in order to enable routing of signals from any bottom level ASIC to a suitable output port of the hybrid optoelectrical switch 700. As in FIG. 6, the connections between ports are illustrated with one-way arrows, and the same or similar connection pattern shown for the two electrical switches and the two optical switches may be extended to other ASICs and optical switches depending on the configuration of the hybrid optoelectrical switch 700. However, example embodiments are not limited thereto, and the connections between electrical switches in the electrical block 704 and optical switches in the optical block 708 may be a design parameter based on empirical evidence and/or preference. Similar to the hybrid optoelectrical switch 600, the output of the hybrid optoelectrical switch 700 (i.e., the outputs of the optical switches) may be connected or connectable to another layer of electrical switches and/or optical switches within a datacenter topology. Any output ports of the bottom level of ASICs that are not coupled to an optical switch in the optical block 708 may instead be connected to or connectable to an input port of an ASIC or an optical switch in another layer of the datacenter topology.

Figure 8:
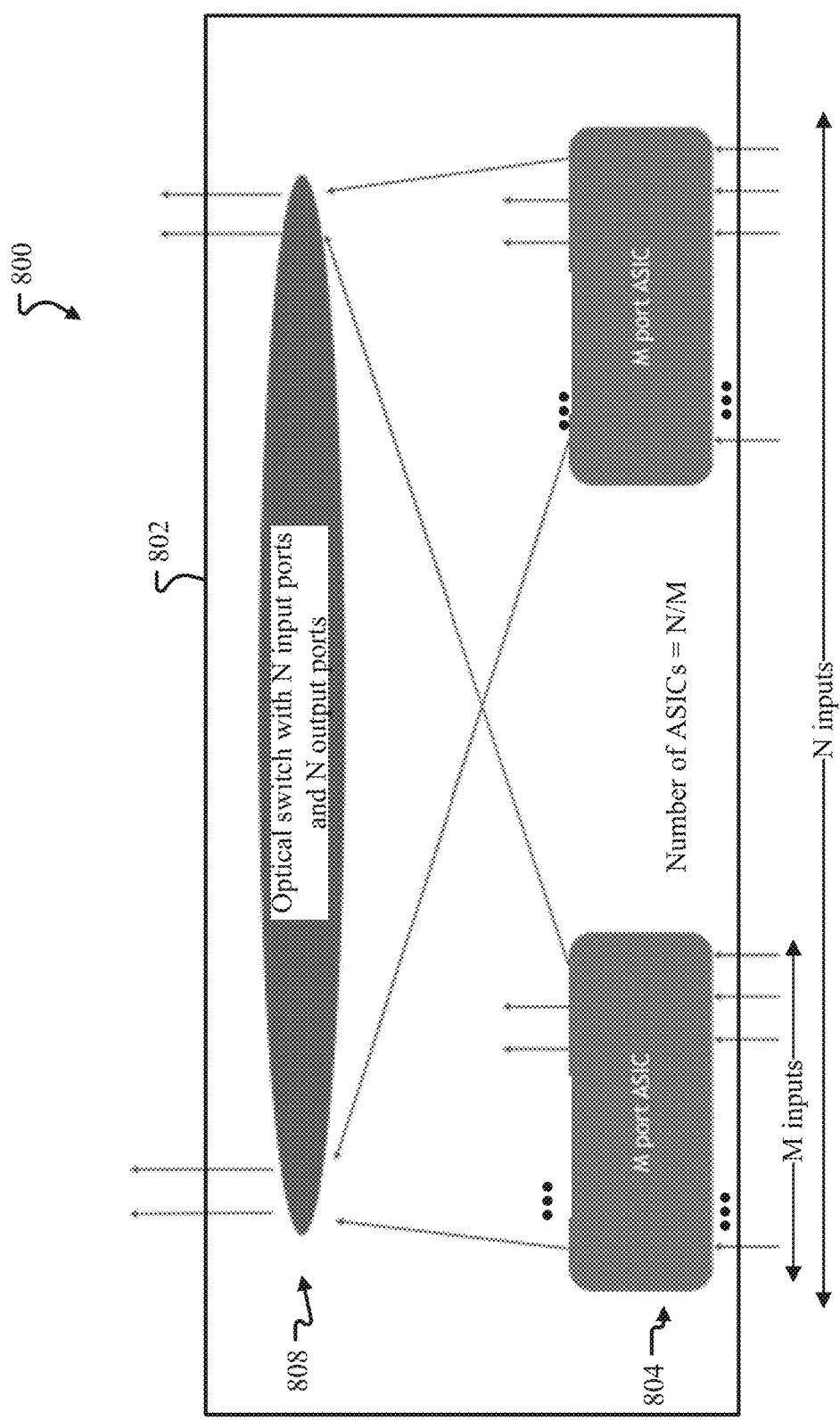
FIG. 8 illustrates another hybrid optoelectrical switch according to at least one example embodiment.

FIG. 8 illustrates a hybrid optoelectrical switch 800 including an electrical block 804 and an optical block 808 co-packaged on the same PCB 802 or other support substrate (e.g., a silicon wafer). The electrical block 804 may include any suitable number of M port ASICs to arrive at a hybrid optoelectrical switch 800 with N number of input ports. The optical block 808 includes a single optical switch with N number of input ports and N number of output ports. Similar to the hybrid optoelectrical switches 600 and 700, the output of the hybrid optoelectrical switch 800 (i.e., the outputs of the optical switch) may be connected or connectable to another layer of electrical switches and/or optical switches within a datacenter topology.

As shown in FIG. 8, output ports of the ASICs face input ports of the optical switch on the PCB 802. FIG. 8 further illustrates example connections between ports of the electrical block 804 and ports the optical block 808. As in FIGS. 6 and 7, the connections between ports are illustrated with one-way arrows, and the same or similar connection pattern shown for the two electrical switches and the two optical switches may be extended to other ASICs and optical switches depending on the configuration of the hybrid optoelectrical switch 800. However, example embodiments are not limited thereto, and the connections between electrical switches in the electrical block 804 and optical switches in the optical block 808 may be a design parameter based on empirical evidence and/or preference. Here, it should be appreciated that although not explicitly shown, the input ports and the output ports of the hybrid optoelectrical switch 800 may be located at a same side of the switch 800 (e.g., the bottom side as in FIG. 5). In this case, the input ports and the output ports of the optical switch in the optical block 808 may face the electrical block 804 on the PCB 802.

In view of the above, it should be appreciated that example embodiments provide hybrid optoelectrical electrical switches, which may be co-packaged into a single device, and may be used in a suitable datacenter topology to provide improved bandwidth, reduced latency, and/or reduced power consumption.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example Embodiments May be Configured According to the Following (1) A device for a network switch, the device comprising:
 N input ports;
 an electrical block including a plurality of electrical switches configured to route signals in an electrical domain, wherein each electrical switch includes M input ports; and
 an optical block coupled to the electrical block and configured to route signals in an optical domain, wherein a configuration of the optical block and a configuration of the electrical block are based on at least a number of the N input ports.

(2) The device of (1), wherein the configuration of the optical block relates to a number of input ports of an optical switch in the optical block and a number of output ports of the optical switch.

(3) The device of one or more of (1) to (2), wherein the configuration of the electrical block relates to a number of the plurality of electrical switches, and wherein M is less than N.

(4) The device of one or more of (1) to (3), wherein the number of the plurality of electrical switches is N/M.

(5) The device of one or more of (1) to (4), wherein the number of input ports and the number of output ports of the optical switch are both equal to N.

(6) The device of one or more of (1) to (5), further comprising:
 a substrate on which the electrical block and the optical block are mounted, wherein the input ports of the optical switch face output ports of the plurality of electrical switches.

(7) The device of one or more of (1) to (6), wherein the number of input ports and the number of output ports of the optical switch are both equal to N/M, wherein the configuration of the optical block relates to a number of optical switches in the optical block, and wherein the number of optical switches in the optical block is M.

(8) The device of one or more of (1) to (7), wherein the number of input ports and the number of output ports of the optical switch are both equal to 2*N/M, wherein the configuration of the optical block relates to a number of optical switches in the optical block, and wherein the number of optical switches in the optical block is M/2.

(9) The device of one or more of (1) to (8), wherein the number of the plurality of electrical switches is 2*N/M.

(10) The device of one or more of (1) to (9), wherein the number of input ports and the number of output ports of the optical switch are both equal to 2*N/M, wherein the configuration of the optical block relates to a number of optical switches in the optical block, and wherein the number of optical switches in the optical block is M/2.

(11) The device of one or more of (1) to (10), further comprising:
 a substrate on which the electrical block and the optical block are mounted, wherein the input ports and the output ports of the optical switch face output ports of an electrical switch in the plurality of electrical switches.

(12) The device of one or more of (1) to (11), wherein the number of input ports and the number of output ports of the optical switch are both equal to N/M, wherein the configuration of the optical block relates to a number of optical switches in the optical block, and wherein the number of optical switches in the optical block is M.

(13) The device of one or more of (1) to (12), wherein the number of input ports and the number of output ports of the optical switch are both equal to 2*N/M, wherein the configuration of the optical block relates to a number of optical switches in the optical block, and wherein the number of optical switches in the optical block is M/2.

(14) The device of one or more of (1) to (13), further comprising:
a substrate on which the electrical block and the optical block are mounted, wherein the input ports of the optical switch face output ports of a first electrical switch of the plurality of electrical switches.

(15) The device of one or more of (1) to (14), wherein the output ports of the optical switch do not face the output ports of the first electrical switch.

(16) The device of one or more of (1) to (15), wherein the number of input ports and the number of output ports of the optical switch are both equal to N/M, wherein the configuration of the optical block relates to a number of optical switches in the optical block, and wherein the number of optical switches in the optical block is M.

(17) The device of one or more of (1) to (16), further comprising:
a substrate, wherein the electrical block and the optical block are co-packaged on the substrate.

(18) The device of one or more of (1) to (17), wherein the optical block is configured to route signals between the plurality of electrical switches in the optical domain, and wherein the optical block is configured to route a packet through a selected optical switch of the optical block, the selected optical switch being selected based on a source of the packet and a destination of the packet.

(19) A semiconductor package, comprising:
a substrate;
N input ports;
an electrical block on the substrate and configured to route signals in an electrical domain, the electrical block including a plurality of electrical switches, wherein each electrical switch includes M input ports; and
an optical block on the substrate and communicatively coupled to the electrical block, the optical block being configured to route signals in an optical domain, wherein a configuration of the optical block and a configuration of the electrical block are based on at least a number of the N input ports.

(20) A system, comprising:
a plurality of network devices configured in a hierarchical network topology, at least one of the network devices including:
N input ports;
an electrical block coupled to the N input ports and including a plurality of switches configured to route signals in an electrical domain, wherein each switch includes M input ports; and
an optical block coupled to the electrical block and configured to route signals in an optical domain, wherein a configuration of the optical block and a configuration of the electrical block are based on a number of the N input ports and a number of the M input ports.

What is claimed is:

1. A device for a network switch, the device comprising:
an enclosure including a substrate;
an electrical block on the substrate and including a plurality of electrical switches, the plurality of electrical switches being configured to route signals in an electrical domain, wherein a total number of input ports for the plurality of electrical switches is equal to N, wherein a total number of input ports for each electrical switch is equal to M, and wherein M is less than N; and
an optical block on the substrate and communicatively coupled to the electrical block, the optical block being configured to route signals in an optical domain, wherein a configuration of the optical block and a configuration of the electrical block are based on at least the N input ports,
wherein the signals routed by the optical block are received solely from the plurality of electrical switches of the electrical block,
wherein the plurality of electrical switches are arranged along a first edge of the substrate and the optical block is arranged along a second edge of the substrate opposite the first edge,
wherein the configuration of the electrical block relates to a number of the plurality of electrical switches, and the number of the plurality of electrical switches is N/M,
wherein the configuration of the optical block relates to a number of optical switches in the optical block, a number of input ports of an optical switch in the optical block, and a number of output ports of the optical switch, and
wherein the number of optical switches in the optical block is M, the number of input ports of the optical switch is equal to N/M, and the number of output ports of the optical switch is equal to N/M.

2. The device of claim 1,
wherein the input ports of the optical switch face output ports of the plurality of electrical switches.

3. The device of claim 1,
wherein the input ports of the optical switch face output ports of a first electrical switch of the plurality of electrical switches.

4. The device of claim 3, wherein the output ports of the optical switch do not face the output ports of the first electrical switch.

5. The device of claim 1, wherein each electrical switch corresponds to an Application Specific Integrated Circuit (ASIC) switch.

6. The device of claim 1, wherein the optical block is configured to route signals between the plurality of electrical switches in the optical domain, and wherein the optical block is configured to route a packet through a selected optical switch of the optical block, the selected optical switch being selected based on a source of the packet and a destination of the packet.

7. A semiconductor package, comprising:
a substrate;
an electrical block on the substrate and configured to route signals in an electrical domain, the electrical block including a plurality of electrical switches, wherein a total number of input ports for the plurality of electrical switches is equal to N, wherein a total number of input ports for each electrical switch is equal to M, and wherein M is less than N; and
an optical block on the substrate and communicatively coupled to the electrical block, the optical block being configured to route signals in an optical domain, wherein a configuration of the optical block and a configuration of the electrical block are based on at least the N input ports, wherein the plurality of electrical switches are arranged along a first edge of the substrate and the optical block is arranged along a second edge of the substrate opposite the first edge, wherein the configuration of the optical block relates to a number of optical switches in the optical block, a number of input ports of an optical switch in the optical block, and a number of output ports of the optical switch, wherein the number of optical switches in the optical block is M/2, and wherein the number of input ports and the number of output ports of the optical switch are both equal to 2*N/M.

8. A system, comprising:
a plurality of network devices configured in a hierarchical network topology, at least one of the network devices including:
an enclosure including a substrate;
an electrical block on the substrate and including a plurality of electrical switches, the plurality of electrical switches being configured to route signals in an electrical domain, wherein a total number of input ports for the plurality of electrical switches is equal to N, wherein a total number of input ports for each electrical switch is equal to M, and wherein M is less than N; and
an optical block on the substrate and communicatively coupled to the electrical block, the optical block being configured to route signals in an optical domain, wherein a configuration of the optical block and a configuration of the electrical block are based on the N input ports and the M input ports, wherein the plurality of electrical switches are arranged along a first edge of the substrate and the optical block is arranged along a second edge of the substrate opposite the first edge, wherein the configuration of the optical block relates to a number of optical switches in the optical block, and the number of optical switches in the optical block is M/2, and wherein the configuration of the electrical block relates to a number of the plurality of electrical switches, and the number of the plurality of electrical switches is 2*N/M.

* * * * *